D. H. SCHLAEGEL.
BUNCHING ATTACHMENT FOR POTATO DIGGERS.
APPLICATION FILED MAR. 23, 1918.
1,296,562.
Patented Mar. 4, 1919.
3 SHEETS—SHEET 1.
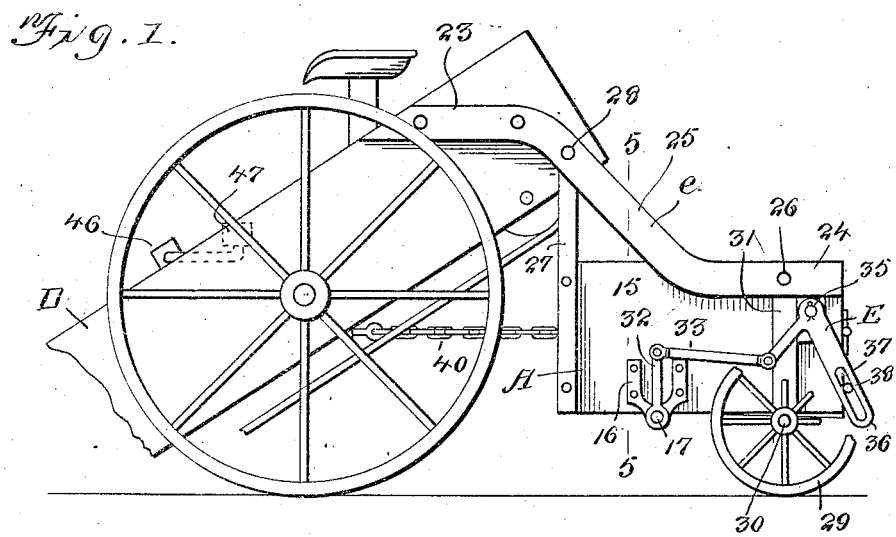
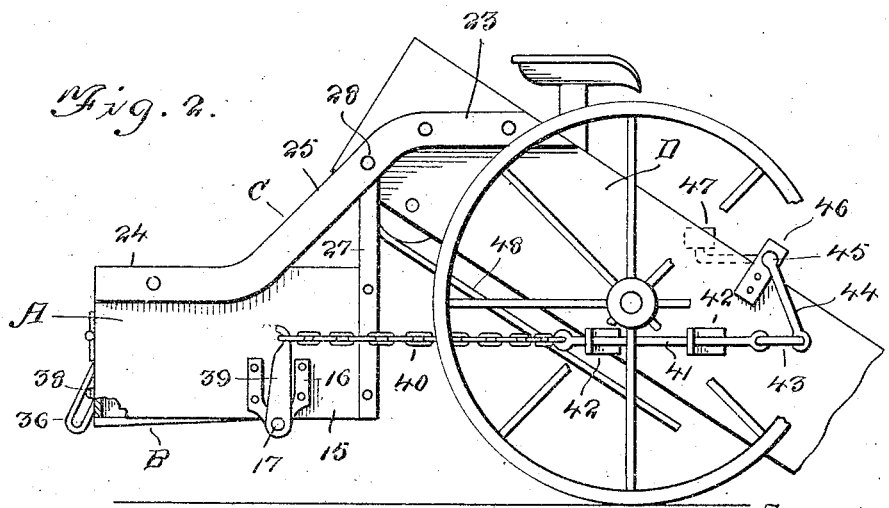

D. H. SCHLAEGEL.
BUNCHING ATTACHMENT FOR POTATO DIGGERS.
APPLICATION FILED MAR. 23, 1918.
1,296,562.
Patented Mar. 4, 1919.
3 SHEETS—SHEET 2.
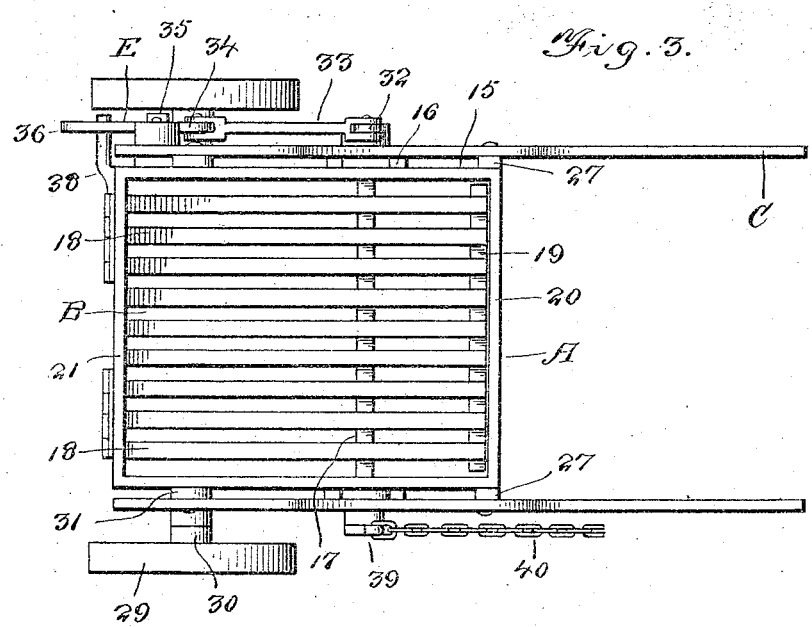
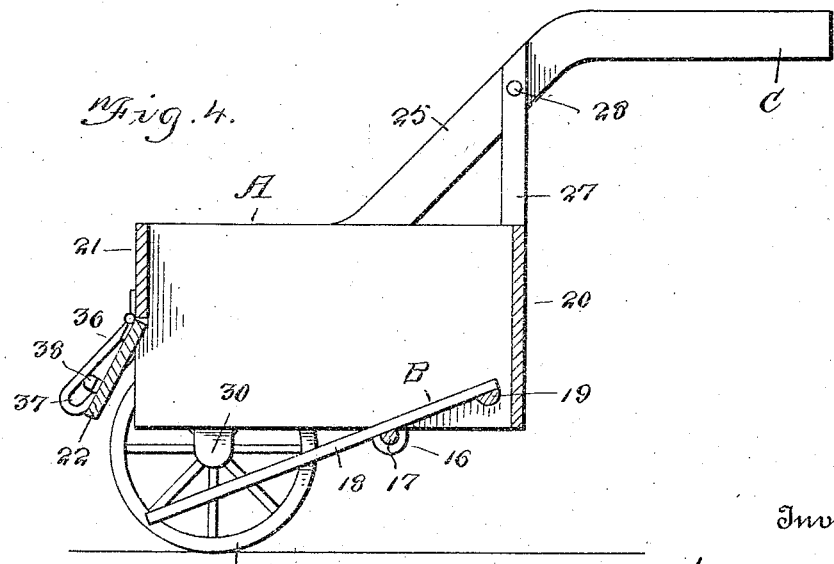

D. H. SCHLAEGEL.
BUNCHING ATTACHMENT FOR POTATO DIGGERS.
APPLICATION FILED MAR. 23, 1918.

1,296,562.

Patented Mar. 4, 1919.
3 SHEETS—SHEET 3.

Witnesses
E. P. Ruppert
Wm Bagger

Inventor
D. H. Schlaegel

By Victor J. Evans
Attorney

UNITED STATES PATENT OFFICE.

DANIEL H. SCHLAEGEL, OF WADENA, MINNESOTA.

BUNCHING ATTACHMENT FOR POTATO-DIGGERS.

1,296,562.

Specification of Letters Patent. Patented Mar. 4, 1919.

Application filed March 23, 1918. Serial No. 224,335.

*To all whom it may concern:*

Be it known that I, DANIEL H. SCHLAEGEL, a citizen of the United States, residing at Wadena, in the county of Ottertail and State of Minnesota, have invented new and useful Improvements in Bunching Attachments for Potato-Diggers, of which the following is a specification.

This invention relates to bunching attachments for potato diggers, and especially for potato diggers of the shaker type that are provided with vine separating attachments although the invention is capable of being usefully applied to other types of diggers that are equipped with means for elevating the potatoes before discharging the same.

The invention has for its object to produce a simple and convenient bunching attachment which may be readily applied to and connected with the potato digger for the purpose of receiving the potatoes until a sufficient quantity has been accumulated, the same being then discharged in a pile on the ground for convenience in subsequent gathering.

A further object of the invention is to simplify and improve the construction of the bunching receptacle and a means for connecting the same with a potato digger.

A further object of the invention is to simplify and improve the bunching receptacle and the means for discharging the contents of the same.

With these and other ends in view which will readily appear as the nature of the invention is better understood, the same consists in the improved construction, novel arrangement and combination of parts which will be hereinafter fully described and particularly pointed out in the appended claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—

Figure 1 is a view in side elevation of the improved bunching attachment.

Fig. 2 is a side elevation of the same as seen from the opposite side, and the supporting wheels being omitted.

Fig. 3 is a top plan view of the device as seen in Fig. 1.

Fig. 4 is a longitudinal vertical sectional view showing the device in dumping or discharging position.

Corresponding parts in the several figures are denoted by like characters of reference.

Figure 5:
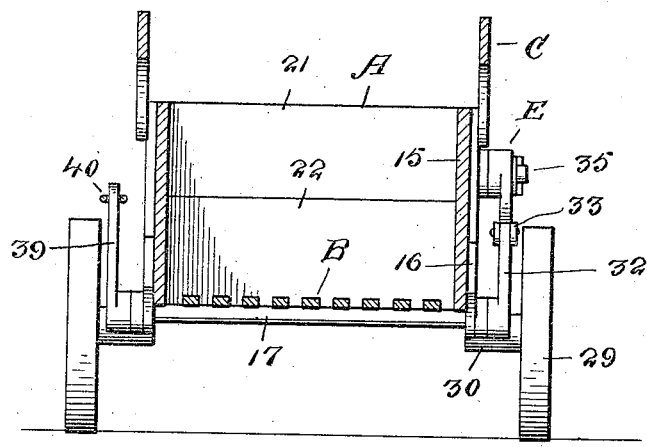
Fig. 5 is a transverse sectional view taken on the line 5—5 in Fig. 1.

The improved device comprises a box or receptacle A which is preferably of rectangular shape but which may be made of any desired shape and dimensions. Secured on the external faces of the side walls 15 of said box are brackets or bearing members 16, the same being extended below the lower edges of the side walls of the box to afford bearings for a shaft 17 that extends transversely beneath the side walls, said shaft carrying the tiltable bottom member B which is formed of a plurality of slats 18, riveted or otherwise secured on the shaft 17 and connected together at their forward ends by a cross bar 19 which is located between the side members of the box and to the rearward of the front wall 20 of said box so as to permit the forward portion of the bottom member to tilt upwardly within the box. The shaft 17 is located well to the forward of the box or receptacle and the rear wall 21 of said receptacle has a hinged door 22 on the bottom edge of which the rearward ends of the slats 18 will abut when said door is in closed position, thereby limiting the tilting movement of the bottom member B in one direction.

Supporting bars C are provided, one at each side of the box or receptacle, said supporting bars having front and rear portions 23, 24 and intermediate portions or offsets 25 whereby the forward portions 23 are disposed in a plane materially higher than that of the rearward portion 24. The rearward ends of the supporting bars C are connected by bolts 26 with the side walls 15 of the receptacle near the upper rear corners of said side walls. Vertical bars or braces 27 are firmly secured on the side walls of the receptacle adjacent to the forward ends thereof, said bars or braces being extended materially above the top edge of the receptacle and connected by means of bolts 28 with the offset portions 25 of the supporting bars C, the latter and the box or receptacle being thus rigidly sustained with respect to each other. The forward end portions 23 of the supporting bars C are to be secured in any convenient manner on the frame of the potato digger, a portion of which appears at D, the parts being so proportioned and arranged that when thus assembled the box or receptacle A will be securely supported clear of the ground. To assist in supporting the weight of the box or receptacle and its contents it may be desirable to provide wheels as seen at 29 in the several figures with the exception of Fig. 2, said wheels being mounted on journals 30 carried by brackets or braces 31 which are secured on the external faces of the side walls of the box near the rearward end thereof.

Figure 6:
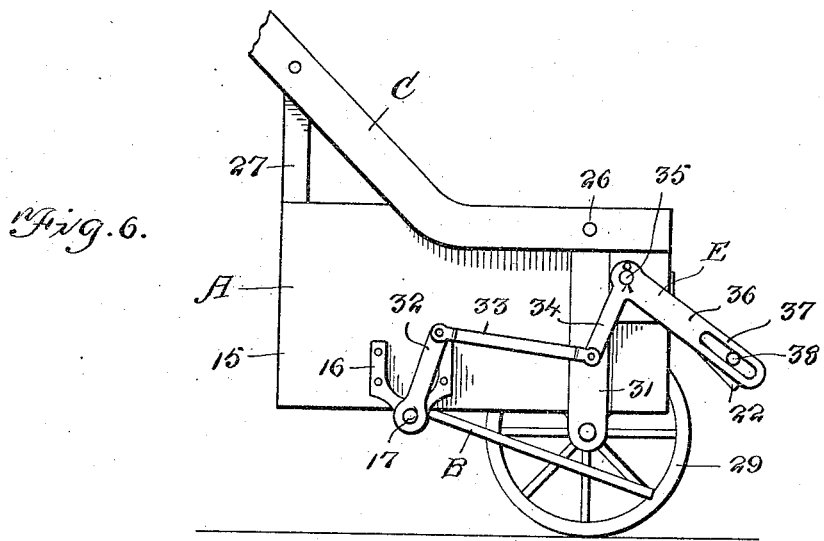
Fig. 6 is a detail side elevation with the door of the receptacle open.

The shaft 17 is provided near one end thereof with a radially extending arm 32 which is connected by a link 33 with one arm 34 of a bell crank E which is supported on a pivot member 35; the other arm 36 has a slot 37 engaging a pin 38 that extends from the door 22. It will thus be seen that when the shaft 17 is rocked for the purpose of moving the tilting bottom member B to a discharging position, the door 22 will be at the same time swung open, as shown in Fig. 6, to facilitate a quick discharge of the contents of the box. Conversely, when the bottom member is moved to a closed position the door will swing shut until the lower edge thereof lies in the path of the rearward ends of the slats 18 of the bottom member, thereby affording a tight closure. Any dirt adhering to the potatoes or carried with the potatoes into the box or receptacle A will be free to escape between the slats and the bottom member.

For the purpose of rocking the shaft 17 to actuate the bottom member B and the door 22, said shaft is provided with a crank 39 with which is connected one end of a flexible element such as a chain 40 the other end of which is connected with one end of a rod 41 which is slidably supported in brackets 42 which may be bolted or otherwise suitably secured on a portion of the frame D of the potato digger in connection with which the improved bunching attachment is used. The forward end of the rod 41 may be connected by means of a link 43 with an arm 44 extending radially from a rock shaft 45 which is supported by a bracket 46 mounted in any convenient position on the potato digger, said rock shaft having a treadle 47 on which the operator may place his foot for the purpose of sustaining the bottom of the bunching receptacle in closed position. When the operator moves his foot from the treadle, the door will gravitationally swing open, but it may be restored to closed position by proper pressure exerted on the treadle. The means just described for actuating the shaft 17 which carries the bottom member B is merely suggestive and may be altered and modified to suit the particular construction of the digger in connection with which the improved bunching attachment is used.

From the foregoing description taken in connection with the drawings hereto annexed it will be readily understood that the potatoes dug or excavated by the digger will be elevated by the elevator of said digger conventionally indicated at 48, and deposited in the box or receptacle A which is carried by the supporting bars C but which may be additionally supported by the ground wheels 29. When a sufficient load has been accumulated the same is discharged in a pile on the ground after which the bottom member B and the door 22 of the receptacle are quickly restored to closed position without interrupting the operation of the digger. The improved device is very simple and inexpensive, and it may be readily attached to or assembled with a potato digger of almost any well known construction.

I claim:—

1. In a bunching attachment for potato diggers, a bunching receptacle, a shaft extending transversely beneath the receptacle, a tiltable bottom member carried by said shaft, a swingingly supported door forming a member of the rear wall of the receptacle, said door having a laterally extending pin, a bell crank fulcrumed on the receptacle and having a slotted arm engaging said pin, a crank on the transverse shaft, and a link connecting said crank at the other end of the bell crank.

2. In a bunching attachment for potato diggers, a bunching receptacle, supporting bars having intermediate offsets whereby the forward portions of said bars are disposed in a plane above that of the rearward portions thereof, means connecting the rearward ends of the supporting bars with the receptacle, vertical braces secured externally on the side walls of the receptacle at the forward ends thereof and extending materially above the receptacle, and means rigidly connecting the upper ends of the braces with the offset portions of the supporting bars.

3. In a bunching attachment for potato diggers, a bunching receptacle, supporting bars having intermediate offsets whereby the forward portions of said bars are disposed in a plane above that of the rearward portions thereof, means connecting the rearward ends of the supporting bars with the receptacle, vertical braces secured externally on the side walls of the receptacle at the forward ends thereof and extending materially above the receptacle, and means rigidly connecting the upper ends of the braces with the offset portions of the supporting bars, and ground wheels connected with the receptacle to assist in supporting the same.

4. In a bunching attachment for potato diggers, a bunching receptacle, supporting bars with which said receptacle is rigidly connected, a shaft extending transversely beneath the receptacle, a tiltable bottom member carried by said shaft, a swingingly supported door forming a member of the rear wall of the receptacle, the bottom edge of said door lying in the path of the rearward end of the tiltable bottom member, said door having a laterally extending pin, a bell crank fulcrumed on the receptacle and having a slotted arm engaging said pin, a crank on the transverse shaft and a link connecting said crank with the other end of the bell crank.

5. In a bunching attachment for potato diggers, a bunching receptacle, supporting bars with which said receptacle is rigidly connected, a shaft extending transversely beneath the receptacle, a tiltable bottom member carried by said shaft, a swingingly supported door forming a member of the rear wall of the receptacle, the bottom edge of said door lying in the path of the rearward end of the tiltable bottom member, said door having a laterally extending pin, a bell crank fulcrumed on the receptacle and having a slotted arm engaging said pin, a crank on the transverse shaft and a link connecting said crank with the other end of the bell crank, in combination with means for controlling the rocking movement of the shaft carrying the tiltable bottom member.

In testimony whereof I affix my signature.

DANIEL H. SCHLAEGEL.

Copies of this patent may be obtained for five cents each, by addressing the "Commissioner of Patents, Washington, D. C."